(12) United States Patent
Lehmann

(10) Patent No.: US 7,424,831 B1
(45) Date of Patent: Sep. 16, 2008

(54) FISHING REEL CLUTCH SETTING DEVICE

(76) Inventor: Roger W. Lehmann, 808 Ashley Ave., Brielle, NJ (US) 08730

( * ) Notice: Subject to any disclaimer, the term of this patent is extended or adjusted under 35 U.S.C. 154(b) by 571 days.

(21) Appl. No.: 10/802,676

(22) Filed: Mar. 17, 2004

(51) Int. Cl.
*G01L 1/26* (2006.01)
(52) U.S. Cl. .................................. 73/862.393
(58) Field of Classification Search ............. 73/862.393
See application file for complete search history.

(56) References Cited

U.S. PATENT DOCUMENTS

| | | | |
|---|---|---|---|
| 4,449,317 A | * | 5/1984 | Brodribb et al. ............... 43/15 |
| 6,433,703 B1 | * | 8/2002 | Tucker .................. 340/815.51 |
| 6,591,222 B2 | * | 7/2003 | Stiner .......................... 702/173 |

OTHER PUBLICATIONS www.eangler.com/proshop/productdetail.asp?prod_id=3623&dept_id=372, eAngler, Jun. 11, 2004.

* cited by examiner

*Primary Examiner*—Max Noori
(74) *Attorney, Agent, or Firm*—Caesar, Rivise, Bernstein, Cohen & Pokotilow, Ltd.

(57) ABSTRACT

An apparatus, such as spring scale, including graduations for percentages of line test values (e.g., 25% and 33%) for a plurality fishing line tests for use with a fishing rod/reel in order to set the reel drag without the need to conduct any calculations. An electronically-operated scale for use with a fishing rod/reel that displays the line test value whenever percentages (e.g., 25% or 33%) of that line test value is reached during reel drag setting, thereby also avoiding the need to conduct any calculations.

4 Claims, 7 Drawing Sheets

| LINE TEST (lbs) | 25% DRAG SETTING (lbs) | 33% DRAG SETTING (lbs) |
|---|---|---|
| 8 | 2 | 2.6 |
| 12 | 3 | 4 |
| 15 | 3.7 | 1.5 |
| 16 | 4 | 5.3 |
| 20 | 5 | 6.6 |
| 25 | 6.2 | 8.3 |
| 30 | 7.5 | 10 |
| 40 | 10 | 13.3 |
| 50 | 12.5 | 16.3 |
| 60 | 15 | 20 |
| 80 | 20 | 26.6 |
| 100 | 25 | 33.3 |
| 120 | 30 | 40 |
| 130 | 32.5 | 43.3 |

FIG. 5

FISHING REEL CLUTCH SETTING DEVICE

BACKGROUND OF THE INVENTION

1. Field of Invention

This invention relates to fishing equipment and, more particularly, to scales used in setting the clutch of fishing reels.

2. Description of Related Art

Many fishing rods include a reel mechanism for controlling the release and wind-up of the fishing line. The reel includes a clutch that permits the fishing line to "slip", thereby avoiding the fishing line breaking if the fish applies to much force to the line. As a result, the clutch provides a safety factor that permits the line to "slip" as opposed to breaking. For example, a typical deep sea fishing line may be rated at 100 lbs of force so that if the catch applies a force of more than 100 lbs, the line would break. By using a clutch in the reel, the fisherman can introduce a safety factor that permits fishing line to be drawn off the reel (i.e., "slip") at a predetermined setting (i.e., force), which is typically set at 25% of the breaking strength or force (also referred to as "line test" or "line test value") of the fishing line. Setting this predetermined value is known as "setting the drag" on the reel.

To set the drag, the reel provides an adjustment means that can be manipulated by the fisherman. One example of such a reel having an adjustment means is the Penn-International 130ST 2-Speed Conventional Reel 1 (FIG. 1). The adjustment means 2 usually provides an infinite adjustment for providing resistance against the line. However, because the fisherman can use any type of fishing line and since fishing line ratings can vary, the adjustment means 2 does not include graduations that provide the fisherman with particular drag settings. In order to determine the drag setting of the reel and then to adjust it, the fisherman needs to connect a force or weight transducer, e.g., a scale, to the end of the fishing line. FIG. 2 provides an example of a conventional spring scale 3 (e.g., Shimano Stainless Steel Spring Scale) that is used by fisherman to determine the drag setting and to then adjust it. FIG. 3 depicts the typical set-up used in accomplishing this. After connecting the free end 4 of the fishing line 5 to the hook 6 of the scale 3, the fisherman pulls a handle 7A (or a grip 7B) of the scale 3 until the line 5 slips and then reads the pounds of force graduations 9 shown by the sliding indicator 8 on the face of the scale 3 housing. If the fisherman wishes to change the drag setting, he/she slightly moves the adjustment means 2 on the reel 1 and then repeats connecting the scale 3 to the free end 4 of the line 5 and pulling on the scale 3 and reading the pounds of force indicated by the sliding indicator 8 on the scale 3.

However, it is difficult for the fisherman to appreciate the drag setting in terms of force. Usually, the fisherman prefers to set the drag at 25% or 33% of the line test. But to achieve that, the fisherman has to make calculations based on the rating of the fishing line and then calculate what drag setting should be used based on the force indicated by the scale 3. Thus, there remains a need for providing a scale that indicates to the user a percentage of the rating of the fishing line so that the fisherman does not have to make calculations to set the drag of the reel.

All references cited herein are incorporated herein by reference in their entireties.

BRIEF SUMMARY OF THE INVENTION

An apparatus for use in setting the drag on a fishing reel having fishing line thereon. The apparatus comprises: a fishing line coupling means coupled to a force or weight transducer (e.g., a spring scale); an indicator (e.g., a sliding indicator), coupled to the force or weight transducer, that changes its indication based on forces applied when the fishing line coupling means is coupled to the fishing line and forces are applied by the apparatus. The indicator indicates a particular fishing line test value, from a plurality of fishing line test values, when the current force applied is a predetermined percentage of the fishing line test value.

An electronic scale for use in setting the drag on a fishing reel having fishing line and having a fishing line test value. The scale comprises: a force sensor, coupled to the fishing line, for converting a force applied to the fishing line into an electrical signal; means for inputting a percentage (e.g., a switch, a keypad, etc.) of the breaking force of the fishing line by the user; a gain stage, coupled to the means for inputting a percentage, for converting the electrical signal into a fishing line test value based on the percentage inputted by the means for inputting a percentage; and a display for displaying the fishing line test value when the corresponding percentage of the breaking force of the fishing line is achieved.

A method for setting the drag on a fishing reel having a fishing line that has a line test value without the need to make any force calculations. The method comprising the steps of: coupling a force or weight transducer to the free end of the fishing line; applying a force or forces to the fishing line; displaying or indicating to the user the fishing line test value whenever a preferred percentage of the fishing line test value is reached; adjusting a drag control mechanism on the fishing reel based on the displayed or indicated fishing line test value.

BRIEF DESCRIPTION OF SEVERAL VIEWS OF THE DRAWINGS

The invention will be described in conjunction with the following drawings in which like reference numerals designate like elements and wherein:

FIG. 5 is a table specifying the graduations as a 25% or 33% of the fishing line test;

DETAILED DESCRIPTION OF THE INVENTION

The invention will be illustrated in more detail with reference to the following examples, but it should be understood that the present invention is not deemed limited thereto.

Figure 1:
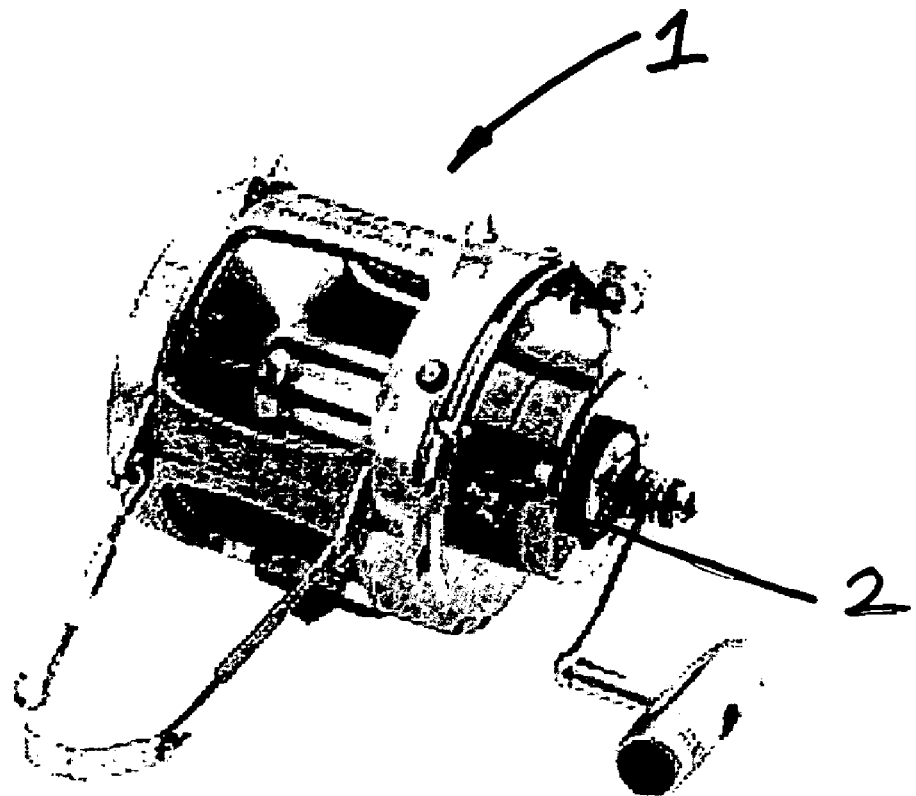
FIG. 1 is an example of a conventional fishing reel.
Figure 2:
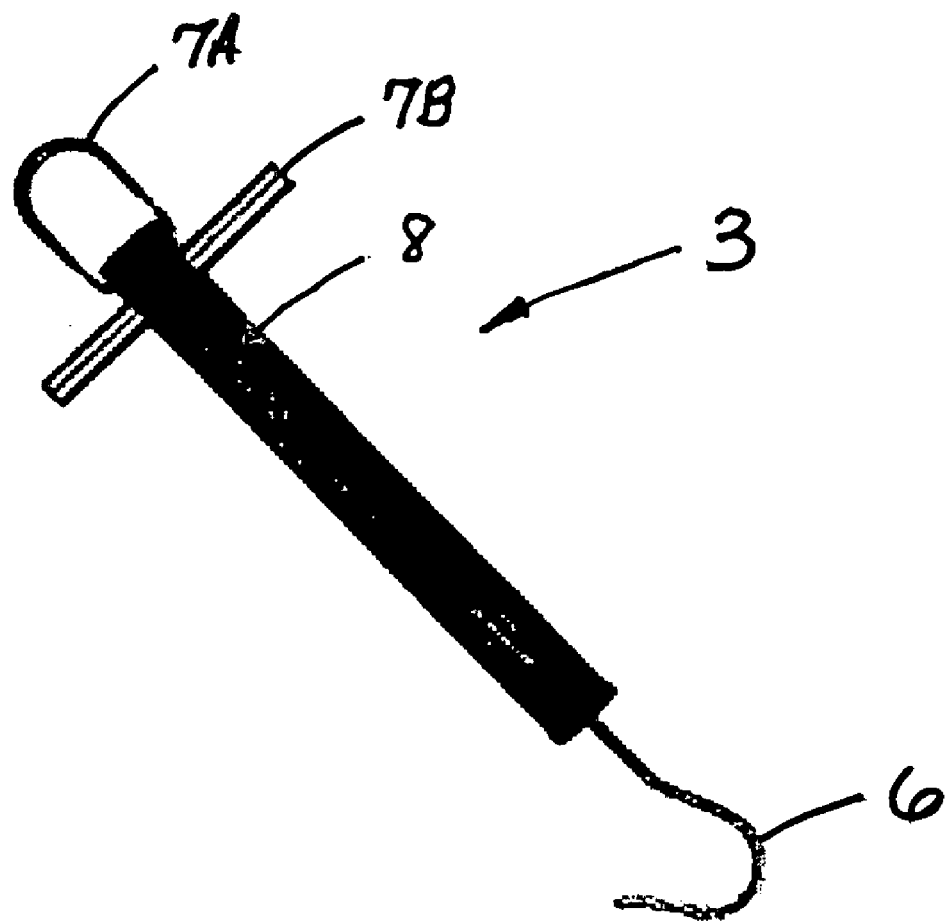
FIG. 2 is an example of a conventional clutch setting scale.
Figure 4:
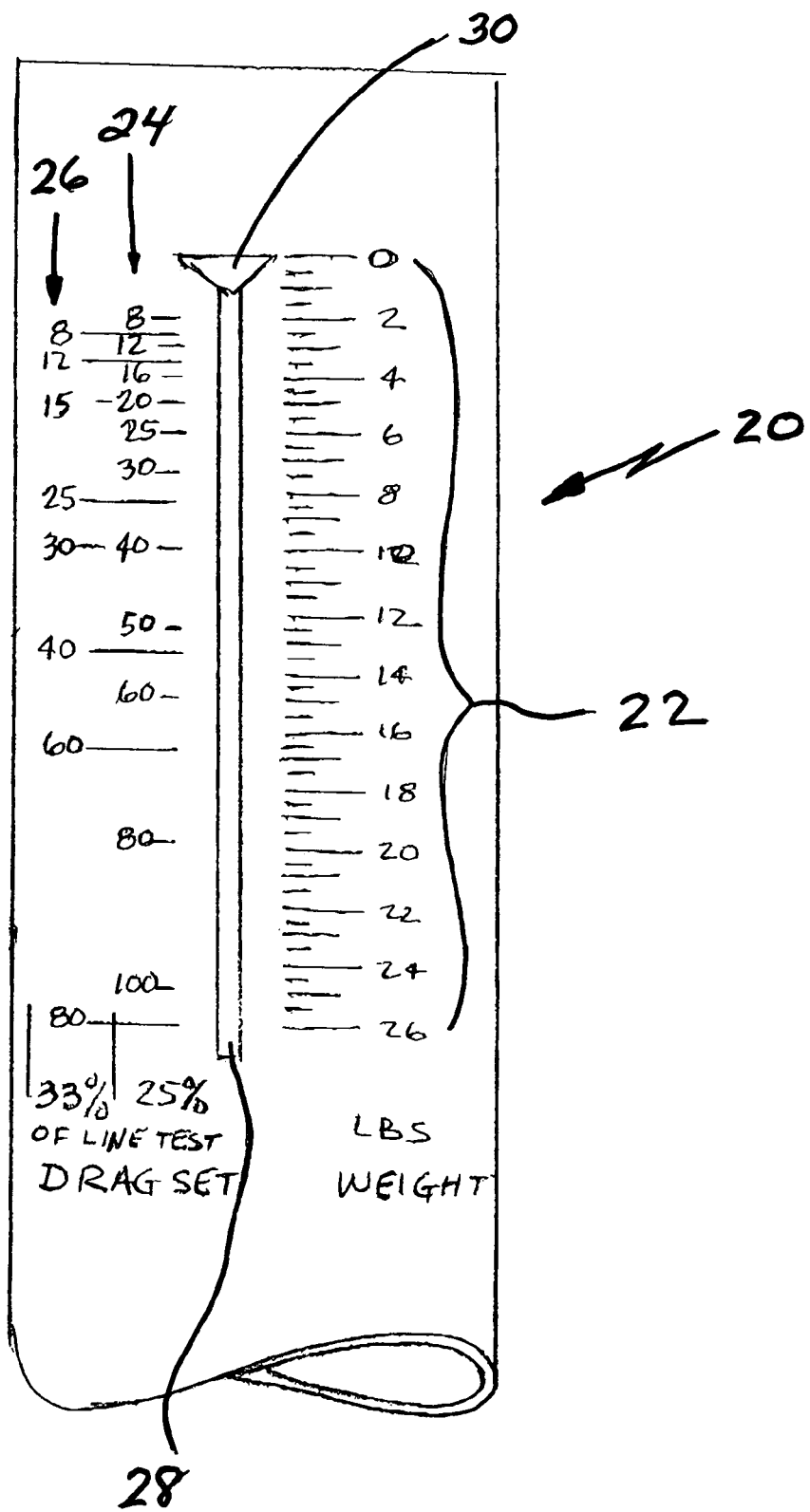
FIG. 4 is a partial view of the clutch setting device of the present invention.

FIG. 4 depicts the graduations on the present invention 20 which is a spring scale. It should be understood that the present invention 20 is similar in construction to any conventional spring scale, such as that shown by way of example in FIG. 2, except that the graduations include percentages of the line test. As shown in FIG. 4, the graduations of the present invention 20 include graduations 22 in terms of pounds. However, in addition, the present invention 20 provides the 25% and 33% drag settings for a plurality of line tests. In particular, the 25% drag settings 24 are provided in an inner, left-hand column next to the slot 28 of the indicator 30; the 33% drag settings 26 are provided in an outer, second left-hand column.

FIG. 5 shows the conversion of each of the 25% and 33% drag settings for a variety of line tests. It should be understood that the structure of the spring scale portion of the present invention 20 is similar to any conventional spring scale (e.g., the present invention 20 also includes a fishing line coupling means (e.g., a hook), a housing, a sliding indicator, and a handle or grip) and, as such, is not discussed any further.

Figure 3:
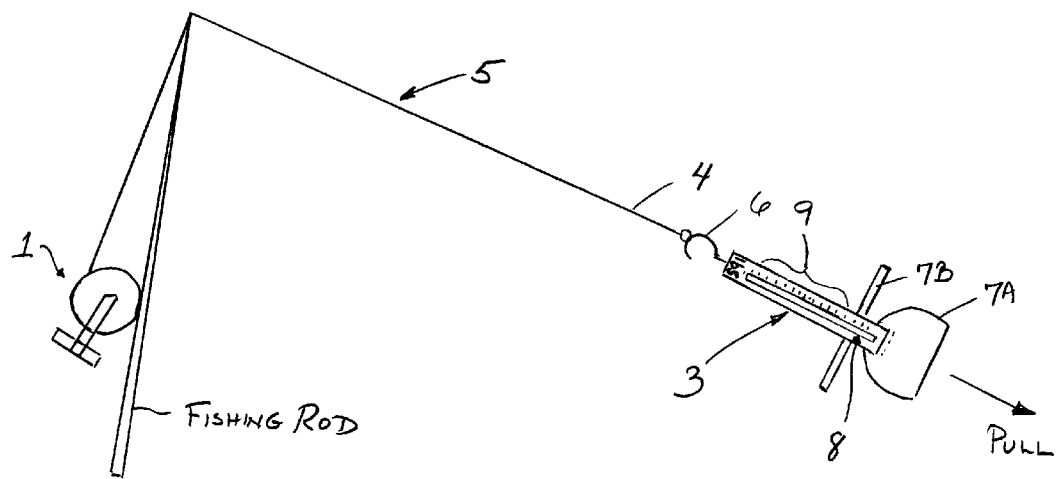
FIG. 3 is a functional diagram of conventional clutch setting scale connected to a fishing rod and reel, depicting how the drag is set on the reel clutch.

To use the present invention 20, the fisherman couples the present invention 20 as shown in FIG. 3, except that the scale 3 would be replaced by the present invention 20. Next, the fisherman would select which of the preferred drag settings that he/she wants to use: 25% or 33% of the line test rating. He/she would then pull on the present invention 20 to see if the reel begins to slip at the numerical indicator for his/her particular line test. If the reel begins to slip at a force above or below the line test indication, then the fisherman manipulates the reel adjustment means 2 until the reel slippage begins at the line test indication.

For example, if the fisherman is using a 60 lb line test, and he/she wants to have the reel slip at 25%, the fisherman connect the present invention 20 to the free end 4 of the fishing line 5, as shown in FIG. 3. He/she would then pull on the present invention 20 and determine if the slippage begins when the indicator 30 is at "60" graduation in the 25% drag setting column 24. If slippage occurs above that "60" graduation, then the fisherman needs to manipulate the adjustment means 2 until slippage occurs when the present invention 20 is pulled and the indicator 30 is at the "60" graduation in the 25% drag setting column 24.

Alternatively, if the fisherman wants to set the drag at 33%, the fisherman would repeat the above procedure, but would observe the "60" graduation using the 33% drag setting column 26.

Thus, it can be appreciated that the fisherman does not have to make any calculations to set the drag of the reel. He/she only needs to know the line test value and which preferred setting, 25% or 33%, he/she would like to set the drag at. Moreover, during the drag setting procedure, the fisherman can simply look across indicator slot 28 at the graduations 22 if he/she wants to know the actual force (in pounds) of the drag setting.

It should be understood that it is within the broadest scope of the present invention to include other percentages (e.g., 1-24%, 26-32%, or 34-99%, or any fraction thereof) of the breaking force of a variety of fishing line tests as distributed graduations on the face of the present invention and that the present invention is not limited just to 25% and 33% of the fishing line test values.

Figure 6A:
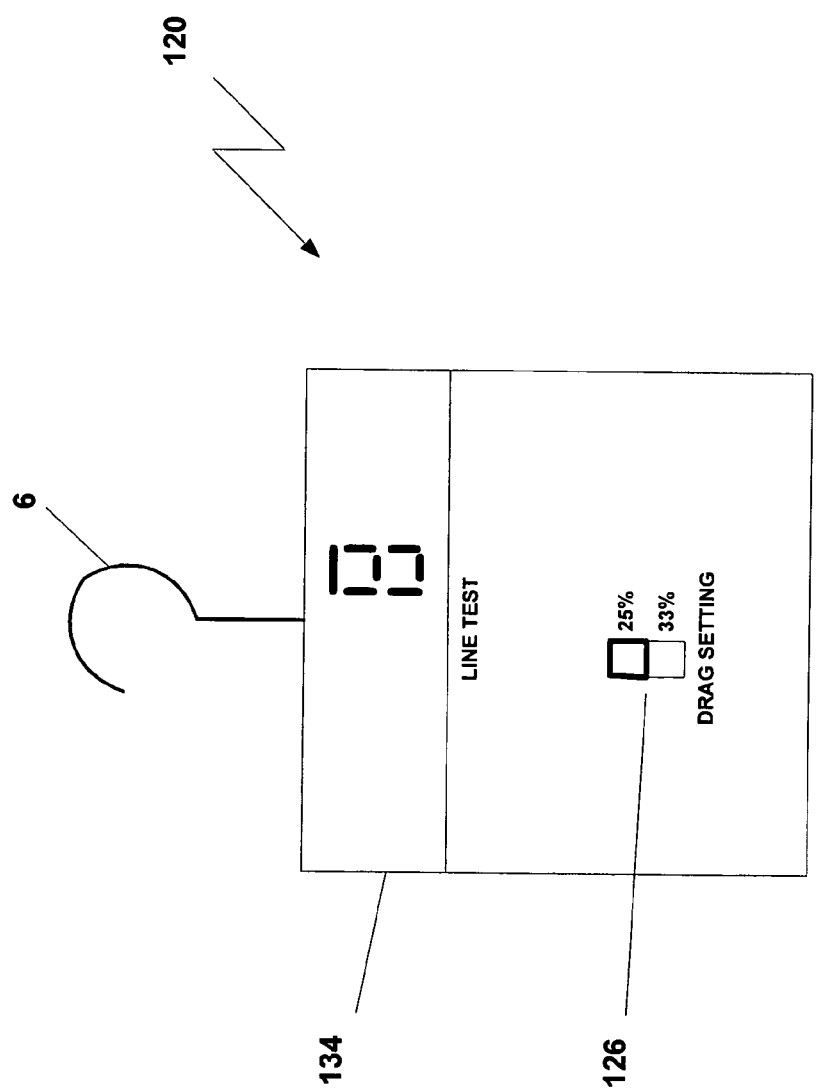
FIG. 6A is an electrically-operated embodiment of the present invention.
Figure 6B:
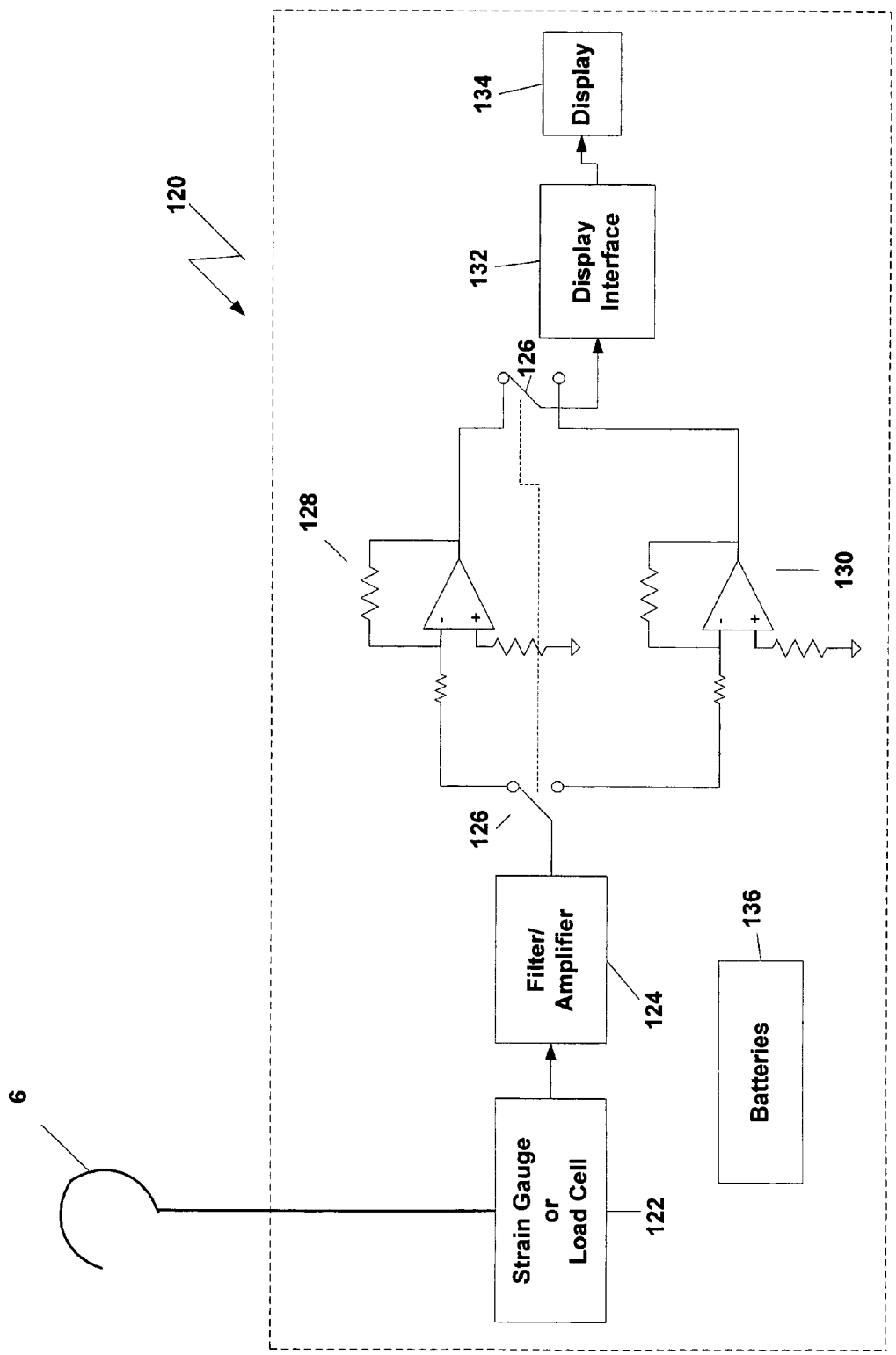
FIG. 6B is a schematic of the electrically-operated embodiment of the present invention.

It is within the broadest scope of the present invention to include an electrically-operated scale wherein said scale provides an electrical display of the line test value when the 25% or the 33% drag setting is reached. FIGS. 6A-6B depict a hand-held electrical scale 120. The scale 120 uses a strain gauge/load cell 122 (hereinafter "sensor 122", e.g., SMD Button Cell—S400) that converts the force exerted on the fishing line coupling means (e.g., hook 6) into an electrical signal that is passed through a filter/amplifier stage 124. The fisherman, sets the preferred drag setting, either the 25% or the 33% drag setting using a switch (e.g., a slider switch) 126. The switch 126 applies the filtered/amplified sensor 122 signal to either a "gain-of-four" stage 128 or a "gain-of-3" stage 130. The output signal of either of these gain stages is fed through a display interface 132 and then onto the display 134 (e.g., a seven-segment display, LCD display, etc.). Power for all internal components is provided by battery power 136. Thus, when the fisherman has coupled the scale 120 to the free end 4 of the fishing line 5 and is pulling on the scale 120, the display 134 displays the line test number, indicating to the fisherman the 25% (or 33%, depending on the setting of the switch 126) point of the line test value displayed; with particular regard to FIG. 6A, if the fisherman is pulling with 2 pounds of force, the display 134 shows line test value 8, in accordance with FIG. 5.

It should be further understood that it is within the broadest scope of the present invention to include a range of percentages (1-99%, or fractions thereof) that can be inputted into the electrically-operated scale 120 (e.g., using a keypad or other input device in the scale 120 which replaces the switch 126) that can allow the percentage of the fishing line test value to be varied by the fisherman; similarly a digital configuration would replace the analog gain stages 128/130 to permit the appropriate gain to be implemented for the particular percentage entered by the fisherman.

While the invention has been described in detail and with reference to specific examples thereof, it will be apparent to one skilled in the art that various changes and modifications can be made therein without departing from the spirit and scope thereof.

What is claimed is:

1. An apparatus for use in setting the drag on a fishing reel having fishing line thereon, said apparatus comprising:
   a fishing line coupling means coupled to a force or weight transducer, said force or weight transducer comprising a spring scale having a housing and a plurality of fishing line test values distributed along the length of said housing, said fishing line test values corresponding to a percentage of the breaking force of said plurality of fishing line test values;
   an indicator, coupled to said force or weight transducer, that changes its indication based on forces applied when said fishing line coupling means is coupled to the fishing line and forces are applied by said apparatus, said indicator indicating a particular fishing line test value, from a plurality of fishing line test values, when the current force applied is a predetermined percentage of said fishing line test value; and
   wherein said plurality of fishing line test values comprise a first set of graduations distributed along the length of said housing and wherein said percentage of the breaking force of a plurality of fishing lines is 25%.

2. The spring scale of claim 1 wherein said plurality of fishing line test values comprise a second set of graduations distributed along the length of said housing and wherein said percentage of the breaking force of a plurality of fishing lines is 33%.

3. An apparatus for use in setting the drag on a fishing reel having fishing line thereon, said apparatus comprising:
   a fishing line coupling means coupled to a force or weight transducer, said force or weight transducer comprising a spring scale having a housing and a plurality of fishing line test values distributed along the length of said housing, said fishing line test values corresponding to a percentage of the break force of said plurality of fishing line test values;
   an indicator, coupled to said force or weight transducer, that changes its indication based on forces applied when said fishing line coupling means is coupled to the fishing line and forces are applied by said apparatus, said indicator indicating a particular fishing line test value, from a plurality of fishing line test values, when the current force applied is a predetermined percentage of said fishing line test value; and wherein said plurality of fishing line test values comprise a first set of graduations distributed along the length of said housing and wherein said percentage of the breaking force of a plurality of fishing lines is 33%.

4. The spring scale of claim 1 wherein said plurality of fishing line test values comprise a second set of graduations distributed along the length of said housing and wherein said percentage of the breaking force of a plurality of fishing lines is 25%.

\* \* \* \* \*